United States Patent
Suzuki et al.

(10) Patent No.: US 8,283,887 B2
(45) Date of Patent: Oct. 9, 2012

(54) PORTABLE DEVICE

(75) Inventors: Katsuya Suzuki, Gunma (JP); Kuniharu Suzuki, Tokyo (JP); Hiroshi Kato, Kanagawa (JP); Manabu Yamazaki, Kanagawa (JP); Mikio Takenaka, Kanagawa (JP); Yuto Takagi, Kanagawa (JP)

(73) Assignees: Sony Corporation, Tokyo (JP); Sony Mobile Communications Japan, Inc., Tokyo (JP)

( * ) Notice: Subject to any disclaimer, the term of this patent is extended or adjusted under 35 U.S.C. 154(b) by 371 days.

(21) Appl. No.: 12/582,899

(22) Filed: Oct. 21, 2009

(65) Prior Publication Data

US 2010/0117590 A1   May 13, 2010

(30) Foreign Application Priority Data

Nov. 13, 2008   (JP) ................ 2008-291443

(51) Int. Cl.
*H02J 7/00* (2006.01)

(52) U.S. Cl. .................... 320/101; 320/114

(58) Field of Classification Search ............ 320/101, 320/114, 138; 429/7
See application file for complete search history.

(56) References Cited

U.S. PATENT DOCUMENTS

| | | | |
|---|---|---|---|
| 2004/0175598 A1* | 9/2004 | Bliven et al. | 429/12 |
| 2005/0275983 A1* | 12/2005 | Franklin et al. | 361/56 |
| 2007/0228740 A1* | 10/2007 | Suso | 290/1 R |
| 2007/0229022 A1* | 10/2007 | Hanafusa et al. | 320/101 |
| 2009/0085512 A1* | 4/2009 | Liang et al. | 320/101 |

FOREIGN PATENT DOCUMENTS

JP   2007-207661   8/2007

* cited by examiner

*Primary Examiner* — Edward Tso
*Assistant Examiner* — Aaron Piggush
(74) *Attorney, Agent, or Firm* — Oblon, Spivak, McClelland, Maier & Neustadt, L.L.P.

(57) ABSTRACT

A portable device includes a case configuring the body of the portable device and a fuel cell system included in the case and having air inlets formed in the surface of the case, and also has a solar cell disposed on a portion on the surface of the case, in which the air inlets are provided. The solar cell has holes corresponding to the air inlets.

5 Claims, 6 Drawing Sheets

PORTABLE DEVICE

BACKGROUND OF THE INVENTION

1. Field of the Invention

The present invention relates to a portable device preferably applied to, for example, a mobile phone device, especially relates to a portable device provided with a fuel cell system as an electric power supply.

2. Description of the Related Art

In recent years, the usage of a fuel cell system as an electric power supply in a portable device such as a mobile phone device has been suggested, and fuel cells of this type have been developed. In a mobile phone device, since functions such as a television-broadcasting viewing function and an audio playback function are mounted, the amount of electric power used in the device is likely to increase, leading to a study for mounting a fuel cell system to prolong the duration of a power supply.

The fuel cell system generates electric power by a reaction of a fuel with oxygen in the air, which are both fed to the fuel cell. Fuel cells are grouped into a passive type or an active type depending on a difference in the process for feeding the fuel to the fuel cell.

The passive fuel cell system has a simple configuration and a high efficiency in power generation efficiency because the fuel and air are statically fed by utilizing a concentration gradient, diffusion, and capillary transport without power for transporting the fuel and air, leading to a low cost. However, the passive fuel cell system has following disadvantages: generated electric power and output density are low; it takes a long start-up time to generate enough amount of electric power; and electric power generation may not be immediately stopped.

The active fuel cell system has following advantages by virtue of the fuel fed from a fuel tank by an auxiliary unit such as a pump and a fan: it takes a short start-up time; and it has high output density. However, the active fuel cell system takes a high cost due to many components such as the auxiliary unit, and the power generation efficiency is lowered due to power to drive the auxiliary unit.

In addition, the active fuel cell system utilizes a secondary cell as an electric power supply in order to drive the auxiliary unit until the fuel cell begins to generate electric power. On the other hand, since the auxiliary unit may not be driven when the secondary cell is run out, the fuel may not be fed, so that electric power may not be generated.

Thus, although the secondary cell is charged by an external electric power supply when the secondary cell is run out, it is troublesome and inconvenient to carry an electric power supply such as an AC adapter only for this charging at any time. In order to avoid this problem, it is suggested, for example, that a solar cell be additionally provided as an auxiliary electric power supply, and that the auxiliary unit be driven by the solar cell when the residual power of the secondary cell is low, so that the fuel is fed to generate electric power.

Figure 6:
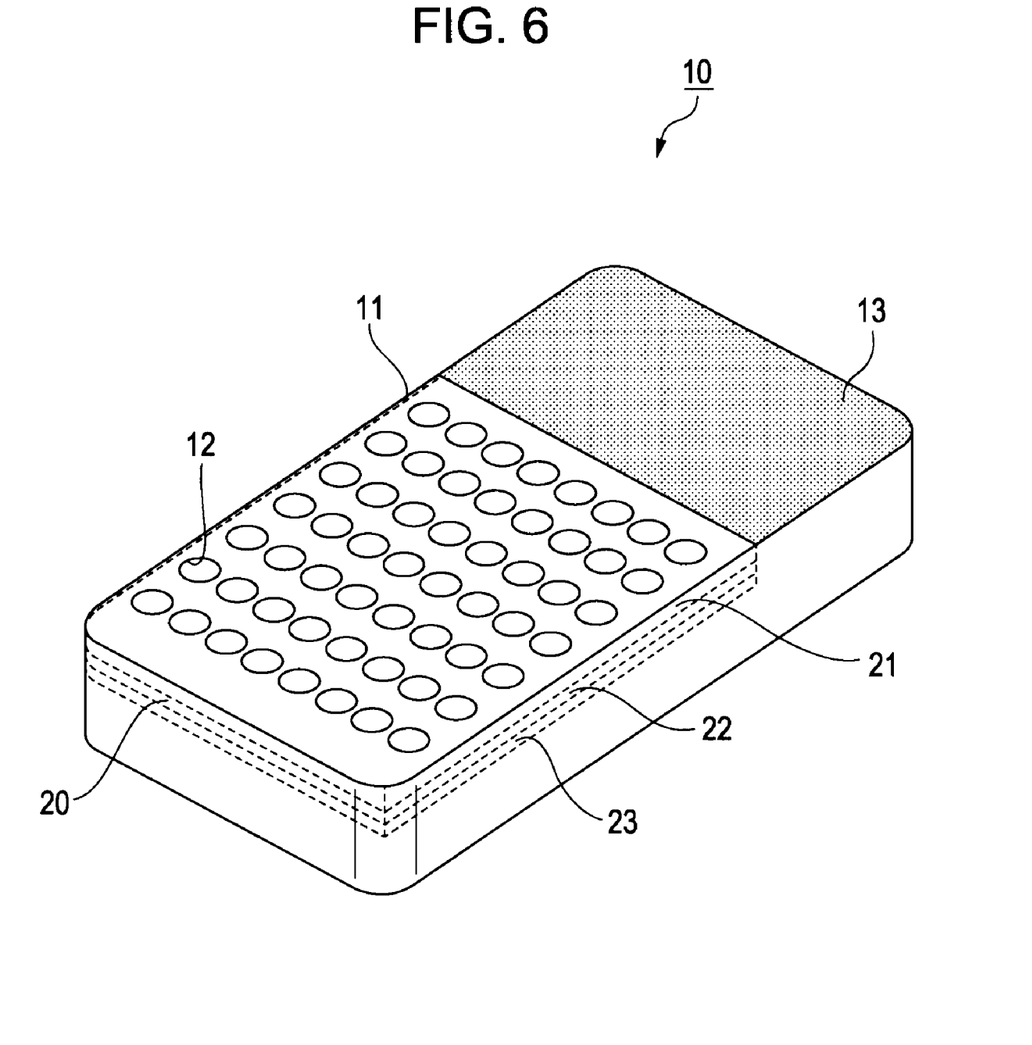
FIG. 6 is a perspective view of an example of a portable device in the related art.

FIG. 6 shows a configuration example of the mobile phone device in this case. A mobile phone device 10 is configured in a case 11 having a square shape. A display, an operation section, a microphone, and a loudspeaker, which function as the mobile phone device, are disposed on the rear surface (downside in FIG. 6, not shown). On a surface which is the upper side in FIG. 6, fuel cell-air inlets 12 are provided, in the approximately two-thirds of the space on a front side, and a solar cell 13 is provided in the approximately one-third of the space on a back side. As shown in FIG. 6, the fuel cell-air inlets 12 are vertically and horizontally disposed in series.

A fuel cell 20 is disposed inside the case 11 at a position corresponding to a position at which the fuel cell-air inlets 12 are disposed. The fuel cell 20 includes an air electrode 21, an electrolyte film 22, and a fuel electrode 23. The fuel cell-air inlets 12 are connected to the air electrode 21. In addition, a fuel tank is omitted in FIG. 6.

The configuration shown in FIG. 6 allows the mobile phone device to include the fuel cell system and the solar cell as the electric power supply. The fuel can be fed to the fuel cell by utilizing the output from the solar cell in cases where, for example, the residual power of an incorporated secondary cell is run out. Japanese Unexamined Patent Application Publication No. 2007-207661 discloses an example of the configuration of an electric power supply combining a fuel cell system and a solar cell.

SUMMARY OF THE INVENTION

Unfortunately, in order to incorporate a fuel cell in a portable device so as to relatively efficiently generate electric power, it may be necessary to provide the fuel cell-air inlets 12 in the most part of the area on the surface of a case as shown in FIG. 6.

Consequently, the configuration in which the fuel cell-air inlets 12 are provided limits a space to dispose the solar cell 13, resulting in difficulty in disposing a large solar cell. Accordingly, in order to dispose the solar cell which can generate electric power to drive the pump and other parts of the fuel cell system, a large case may be configured, resulting in a difficulty in incorporating both the fuel cells and the solar cell in the portable device such as a mobile phone device.

Although the solar cell is distributed on, for example, the side of the case to secure an area, the angle and the existence or nonexistence of incident solar light vary with the surface. As a result, power generation efficiency is low, and it is difficult to generate enough electric power.

It is desirable to secure an area to mount the fuel cell system in the portable device mounting the fuel cell system and the solar cell thereon.

According to an embodiment of the present invention, a fuel cell system and a solar cell are attached to a case configuring the body of a portable device.

The fuel cell system is included in the case, and air inlets are formed on the surface of the case. The solar cell is disposed on a portion, on the surface of the case, in which the air inlets are formed, and has holes corresponding to the air inlets.

Configuration of this type allows the air inlets and the solar cell to be disposed in the same portion on the surface of the case.

According to an embodiment of the present invention, air inlets for a fuel cell system and a solar cell are allowed to be disposed in the same portion on the surface of a case, and the area of the solar cell placable to the case is not limited by positions at which the air inlets of the fuel cell system are formed, and a large solar cell can then be disposed. Accordingly, a solar cell with a large size can be disposed, the large size being enough to generate electric power for driving the fuel feeding section of the fuel cell system when the residual power of a secondary cell inside the device is run out, resulting in an appropriate start-up of the fuel cell system incorporated in the portable device.

DESCRIPTION OF THE PREFERRED EMBODIMENTS

Figure 1:
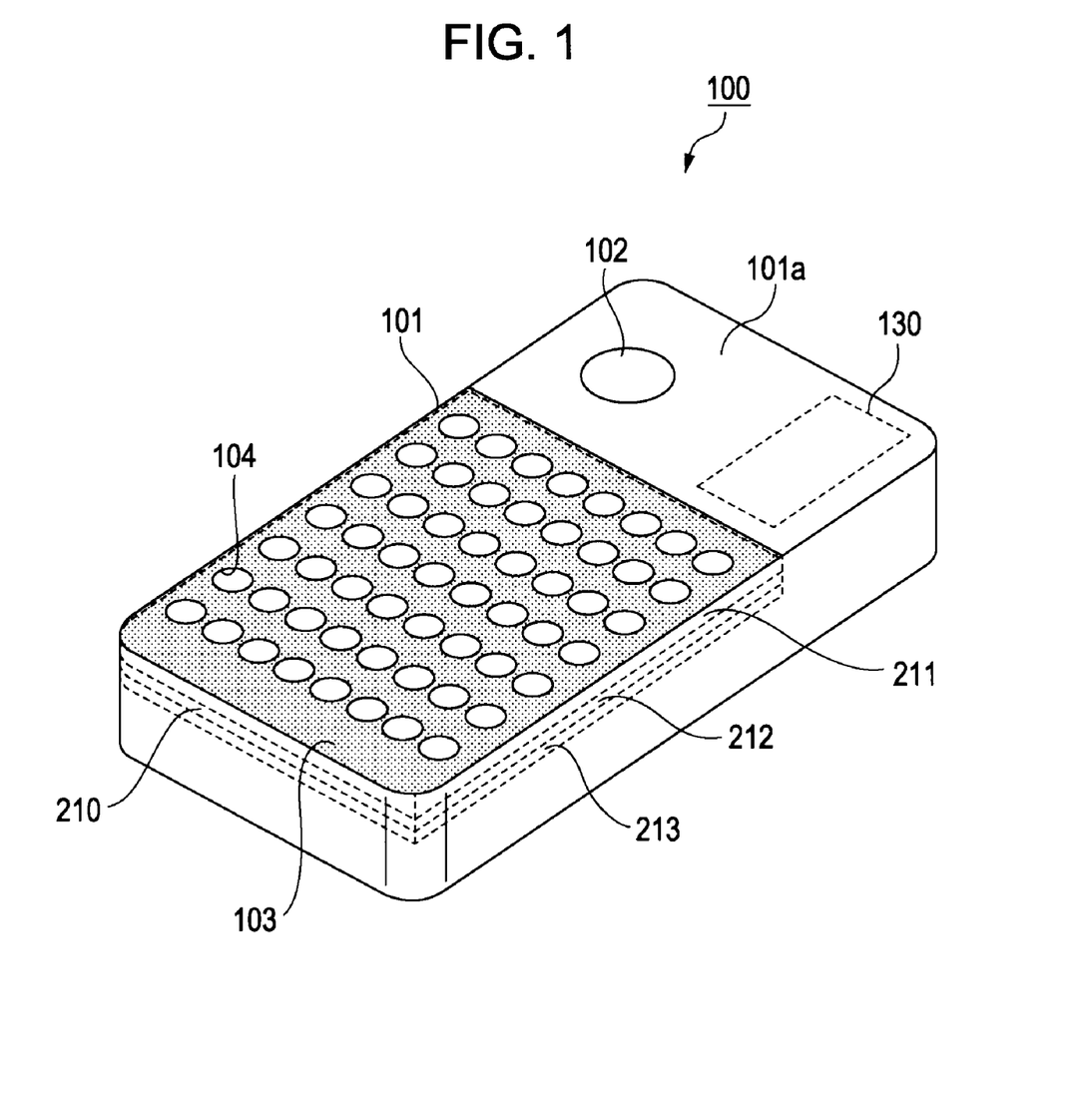
FIG. 1 is a perspective view of an example of an external shape according to a first embodiment of the present invention.
Figure 2:
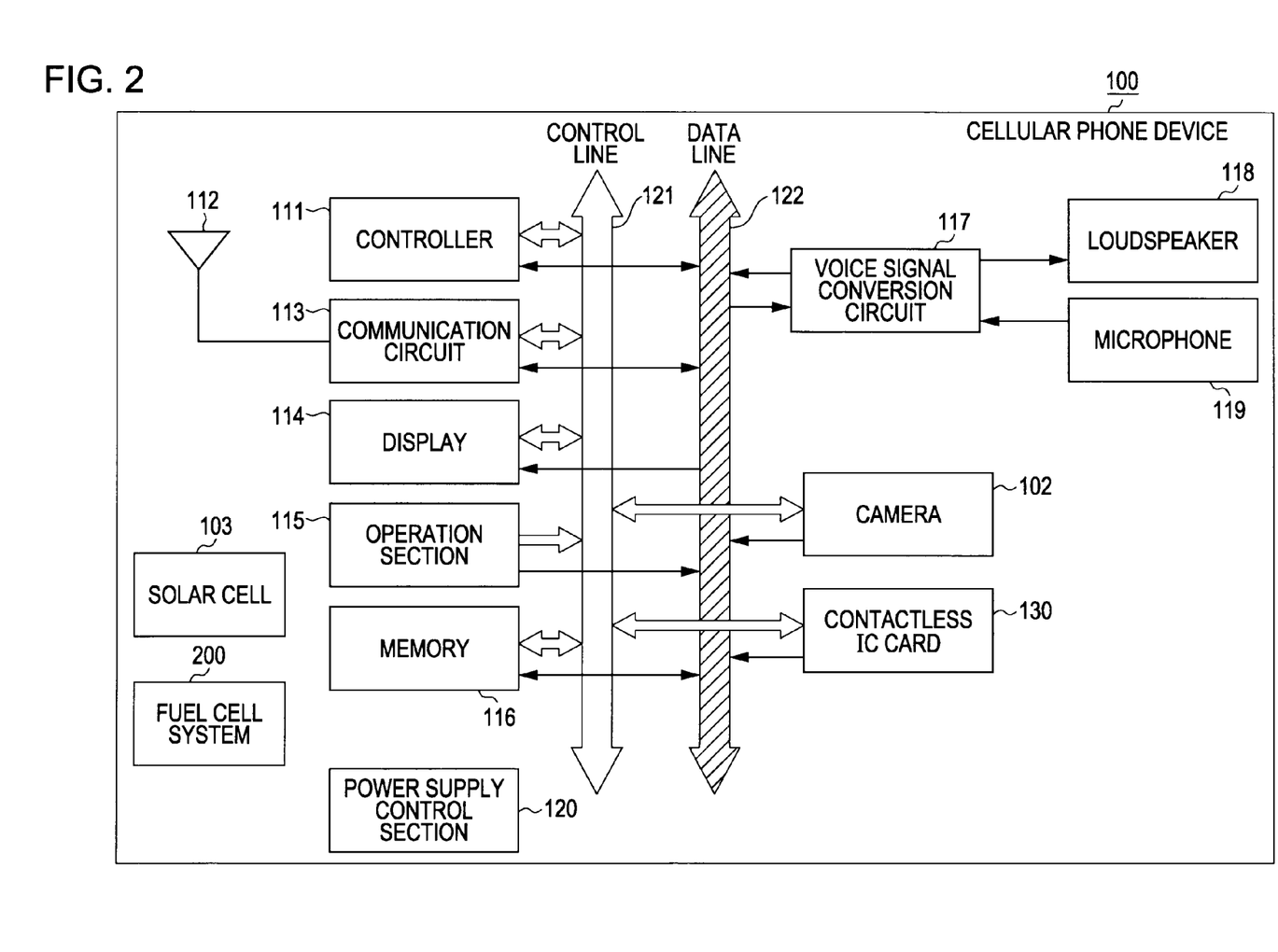
FIG. 2 is a block diagram of an example of an internal configuration according to the first embodiment of the present invention.
Figure 3:
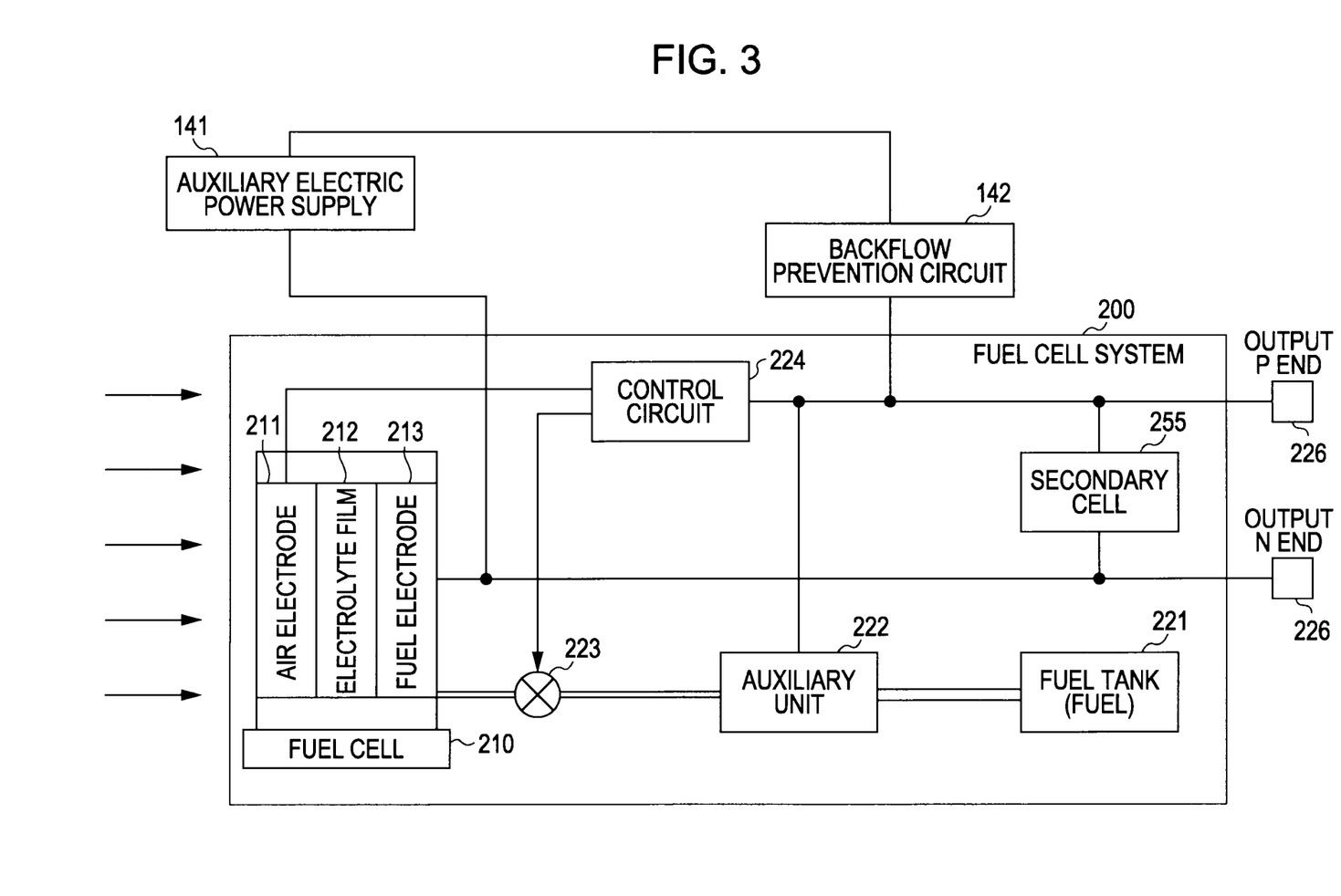
FIG. 3 is a block diagram of a configuration example of a fuel cell system according to the first embodiment of the present invention.
Figure 4:
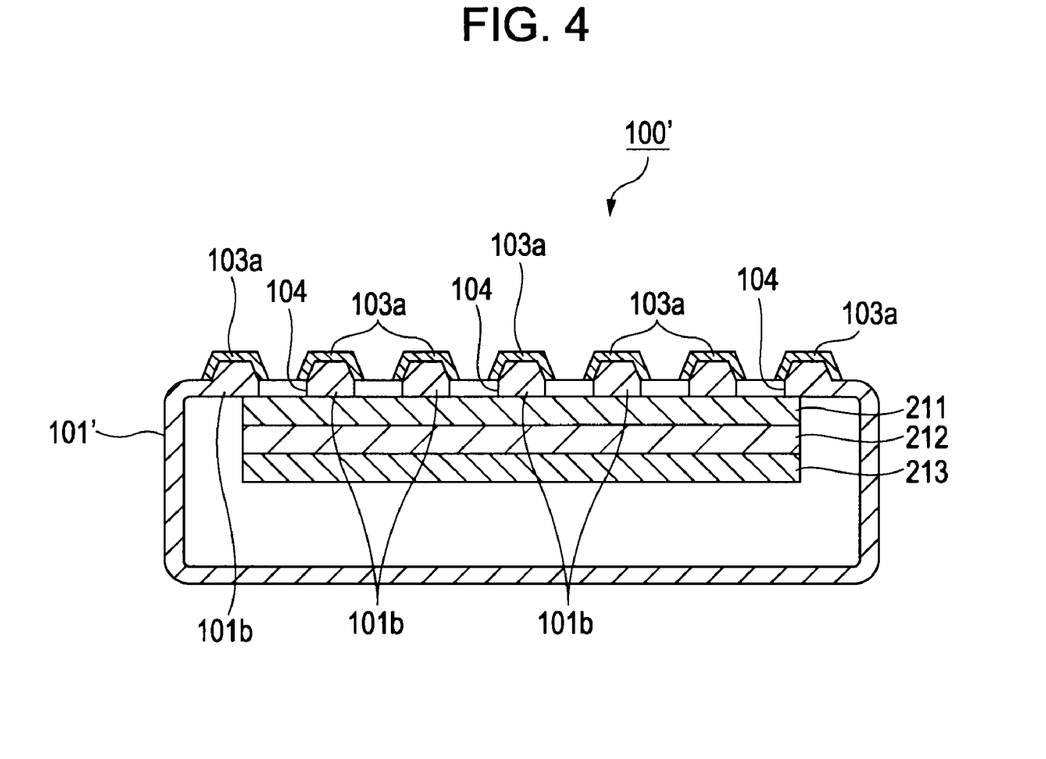
FIG. 4 is a cross sectional view of a modification of the main portion of the first embodiment of the present invention (an example of the three-dimensional configuration of a solar cell)
Figure 5:
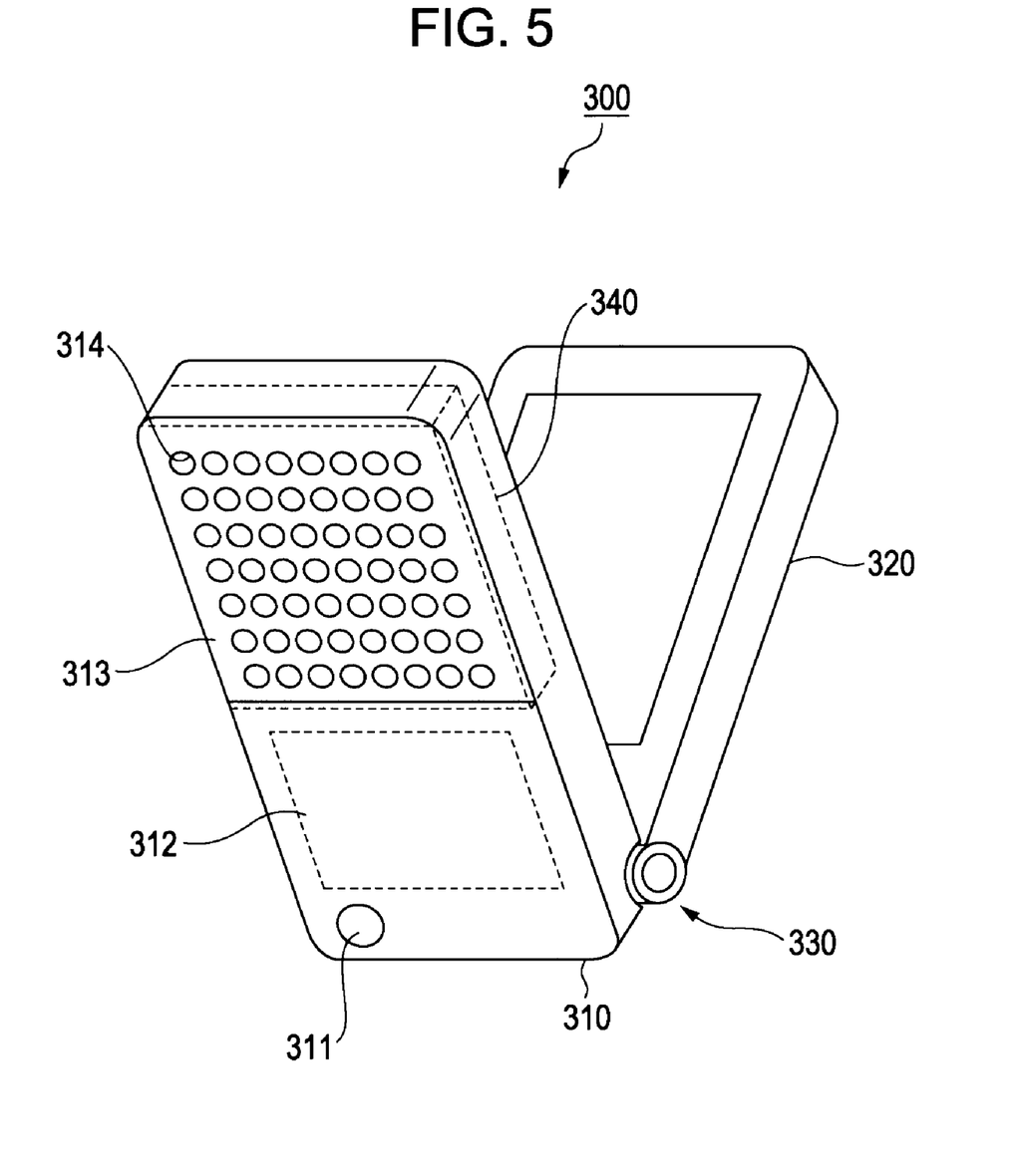
FIG. 5 is a perspective view of an example of an external shape according to a second embodiment of the present invention.

Embodiments of the present invention are described below in the following order.
1. External Shape of a Portable Device According to a First Embodiment: FIG. 1
2. Internal Configuration of the Portable Device According to the First Embodiment: FIGS. 2 and 3
3. Example of a Modification According to the First Embodiment: FIG. 4
4. External Shape of a Portable Device According to a Second Embodiment: FIG. 5

[1. External Shape of a Portable Device According to a First Embodiment]

An example of the first embodiment according to the present invention is described with reference to FIGS. 1 to 3.

FIG. 1 is a perspective view showing the external shape of a portable device in an example of this embodiment. A mobile phone device 100 is configured in a case 101 having a square shape. A display, an operation section, a microphone, and a loudspeaker, which function as the mobile phone device, are disposed on the rear surface (downside in FIG. 1, not shown). On a surface 101a which is the upper side in FIG. 1, fuel cell-air inlets 104 are provided, in the approximately two-thirds of a space on a front side. As shown in FIG. 1, a plurality of the fuel cell-air inlets 104 are vertically and horizontally provided at a predetermined space in series. The fuel-cell air inlet 104 is a hole to take in air into an air electrode 211 of a fuel cell 210. As indicated by the dashed lines in FIG. 1, the fuel cell 210 is disposed on a position contacting with the surface 101a from within the case 101.

In this embodiment, a solar cell 103 is disposed in a portion, on the surface 101a of the case, in which the fuel cell-air inlets 104 are formed. The solar cell 103 is provided with through-holes corresponding to the fuel cell-air inlets 104. Accordingly, the solar cell 103 is configured so as not to block the fuel cell-air inlets 104 in cases where the solar cell 103 is disposed on the surface 101a of the case.

In order that a fuel cell system efficiently generates electric power, it is preferable that the position on which the fuel cell-air inlets 104 be provided has an aperture ratio of approximately 40%, and the aperture ratio in this embodiment is set to 40%. Thus, the solar cell 103 secures the residual area other than the area where the fuel cell-air inlets 104 are provided, in other words, it secures 60% of the area in cases where the air inlets are not formed.

A camera 102 and a contactless integrated circuit (IC) card 130 are incorporated in the mobile phone device 100 in this embodiment. The camera 102 and contactless IC card 130 are disposed on a position on the upper side of the case 101 on which the solar cell 103 and the fuel cell-air inlets 104 are not provided. The lens of the camera 102 is exposed on the surface 101a of the case. The contactless IC card 130 is included in the case 101 and may not be externally seen. The contactless IC card 130 does not necessarily have a shape of IC card, but a term of a contactless IC card is used herein to simplify a description.

[2. Internal Configuration of the Portable Device According to the First Embodiment]

Next, an internal configuration example of the mobile phone device 100 according to this embodiment is described.

The mobile phone device 100 includes a controller 111 to send an instruction to each section inside the mobile phone device 100 through a control line 121. Except the control line 121, the mobile phone device 100 also includes a data line 122 to transmit each data.

In addition, an antenna 112 wirelessly communicating with a base station for a radio telephone is connected to a communication circuit 113 to send and receive a radio signal. A voice signal obtained by receiving in the communication circuit 113 is transmitted to a voice signal conversion circuit 117, and output from a loudspeaker 118 as an analogue voice signal. A voice signal picked up by a microphone 119 is transmitted to the communication circuit 113 as a digital voice data through the voice signal conversion circuit 117. A power supply control section 120 provides electric power from a fuel cell system 200 with each section inside the mobile phone device 100.

The mobile phone device 100 has a display 114 including a liquid crystal display panel or the like, on which various characters and images are displayed under control of the controller 111. An operation section 115 includes dial keys such as numeric keys and various function keys, and provides the controller 111 with operating information of each key. A memory 116 stores a program used in the controller 111 and various stored data.

The controller 111 controls shooting in the camera 102 and communication in the contactless IC card 130.

Each section of the mobile phone device 100 operates by electric power supplied from the fuel cell system 200. The fuel cell system 200 is provided with the solar cell 103 as an auxiliary power supply.

FIG. 3 is a block diagram showing a configuration example of the fuel cell system 200 of this embodiment.

The fuel cell system 200 includes the fuel cell 210. The fuel cell 210 includes the air electrode 211, an electrolyte film 212, and a fuel electrode 213. The air electrode 211 is externally provided with air through the fuel cell-air inlets 104 shown in FIG. 1. Fuel is fed to the fuel electrode 213 from a fuel tank 221 through an auxiliary unit 222 and a valve 223. The auxiliary unit 222 includes a fuel feeding mechanism such as a pump and a fan.

A control circuit 224 controls the fuel feeding. In other words, the control circuit 224 controls the operation of the auxiliary unit 222 and the opening and closing of the valve 223 to regulate the feed rate of the fuel. Consequently, a fuel feeding section includes the control circuit 224, the auxiliary unit 222, and the valve 223.

A secondary cell 225 is charged with the output of the electric power generated by the fuel cell 210, and the output is output from an output terminal 226 and then supplied as electric power to each section inside the mobile phone device 100 through the power supply control section 120. Various types of a secondary cell applicable as the secondary cell 225 include a lithium-ion cell and a nickel hydride cell, and an electrical storage element such as a high capacity capacitor.

An auxiliary electric power supply 141 is connected to the secondary cell 225 in parallel. A backflow prevention circuit 142 is connected to the auxiliary electric power supply 141 in series. In this embodiment, the solar cell 103 shown in FIG. 1 is used as the auxiliary electric power supply 141.

In this configuration, the auxiliary unit 222 allows the fuel stored in the fuel tank 221 to be supplied to the fuel electrode 213 of the fuel cell 210, and a catalyst in the fuel electrode accelerates the ionization of the fuel. A resultant electron moves to the air electrode 211 through an external circuit to generate electric power. The electron is combined with oxygen supplied to the air electrode 211. Since the auxiliary unit 222 generally operates by electric power generated from the secondary cell 225 and the fuel cell 210, the auxiliary unit 222 does not operate in cases where the residual power of the secondary cell is run out and electric power generation in the fuel cell 210 stops, so that it is difficult to start the electric power generation due to the insufficiency of the fuel supply. On the other hand, the configuration of this embodiment includes the auxiliary electric power supply 141 having the solar cell 103 to drive the auxiliary unit 222, leading to operating the fuel cell 210.

Furthermore, in this embodiment, as shown in FIG. 1, since the solar cell 103 is disposed on a portion in which the fuel cell-air inlets 104 are provided, it can be configured to be a relatively large-scale. Accordingly, even if the case 101 is small, the solar cell having a size which can generate start-up electric power necessary as the auxiliary electric power supply 141 can be disposed.

Since this embodiment allows the solar cell 103 to dispose a position on which the fuel cell-air inlets 104 are provided, empty space is provided on the surface of the case, so that the camera 102 and the contactless IC card 130 can be disposed as shown in FIG. 1. Consequently, each functional section is effectively disposed on a small case.

[3. Example of a Modification According to the First Embodiment]

An example of a modification of the portable device according to the first embodiment is described with reference to FIG. 4.

In this modification, positions on which the solar cell and fuel cell-air inlets are disposed are configured to be a three-dimensional configuration.

FIG. 4 shows an example of the cross sectional shape of a case 101' of a mobile phone device 100' in the modification.

As shown in FIG. 4, a plurality of the fuel cell-air inlets 104 are provided in series on the surface of the case 101', and a case protrusion 101*b* is provided between each two adjacent inlets 104 on the surface of the case. In this example, the case protrusion 101*b* is tapered so that the size of the air inlet 104 increases at more outer (more upper) positions of the inlet 104. Although the case protrusion 101*b* is cross-sectionally shown in FIG. 4, it is configured to be an expanding shape like a circular cone.

A solar cell 103*a* having a three-dimensional shape corresponding to the case protrusion 101*b* is disposed in the form of covering the case protrusion 101*b*. In this example, the solar cell 103*a* does not block a position on which the fuel cell-air inlets 104 are provided.

The air electrode 211, electrolyte film 212, and fuel electrode 213 of the fuel cell 210 are disposed beneath the fuel cell-air inlets 104 of the case 101' as shown in FIG. 4.

Other sections of the mobile phone device 100' are configured in a manner similar to the mobile phone device 100 shown in, for example, FIGS. 1 to 3.

The peripheries of the fuel cell-air inlets 104 are configured to be a three-dimensional shape as shown in FIG. 4, leading to a larger area releasing heat in the fuel cell and to a shape easily taking in air from the fuel cell-air inlets 104. Furthermore, three-dimensionally disposing the solar cell 103*a* corresponding to the uneven three-dimensional shape leads to effective incident-light to the solar cell 103*a* and results in an expanded area to dispose the solar cell 103*a*, resulting in effective electric power generation.

In addition, the three-dimensional shape is not limited to the example shown in FIG. 4.

[4. External Shape of a Portable Device According to a Second Embodiment]

Next, an example of a second embodiment of the present invention is described with reference to FIG. 5.

FIG. 5 is a perspective view of an external shape showing a configuration example in this embodiment. In this example, the embodiment of the present invention is applied to a so-called foldable mobile phone as a mobile phone device 300 in which a first case 310 is openably connected to a second case 320 with a hinge part 330.

The first case 310 includes an operation section, and the second case 320 includes a display.

A fuel cell 340 is disposed in the first case 310. Fuel cell-air inlets 314 for the fuel cell 340 are disposed on the outer surface of the first case 310. A plurality of the fuel cell-air inlets 314 are vertically and horizontally provided at a predetermined space in series. A solar cell 313 is disposed on a position on which the fuel cell-air inlets 314 are provided. A through-hole is formed such that the solar cell 313 in this embodiment also does not block the fuel cell-air inlets 314.

A camera 311 and contactless IC card 312 are disposed on a position on the first case 310 on which the solar cell 313 and the fuel cell-air inlets 314 does not provided.

The configurations of FIGS. 2 and 3 described in the first embodiment can be applied to the internal configuration of the mobile phone device 300.

This configuration has an advantage, similar to the first embodiment, to effectively allow the solar cell 313 and the fuel cell-air inlets 314 to be also provided on the mobile phone device 300 of this embodiment.

The present invention is not limited to the configurations according to the embodiments described above. The embodiments of the present invention can be applied to various portable electronic devices such as, for example, a portable audio device, a laptop, and a portable video game player. The external shapes shown in FIGS. 1 and 5 are preferred examples, but other shapes may be applicable.

The present application contains subject matter related to that disclosed in Japanese Priority Patent Application JP 2008-291443 filed in the Japan Patent Office on Nov. 13, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A portable device comprising:
a case configuring a body of the portable device;
a fuel cell system included in the case and having a plurality of air inlets provided on a surface of the case; and
a solar cell disposed on the surface of the case, the solar cell having a plurality of holes corresponding to the air inlets, wherein the plurality of holes have an aperture ratio of approximately 40%, wherein
the plurality of holes are provided in series on the surface of the case, the surface of the case includes protrusions between each of the plurality of holes, and each of the protrusions have shape that tapers as the protrusions extend away from the surface of the case.

2. The portable device according to claim 1, wherein the fuel cell system comprising;

a fuel cell including an air electrode, a fuel electrode, and an electrolyte film disposed between the air electrode and the fuel electrode;

a fuel tank storing fuel used for electric power generation in the fuel cell;

a fuel feeding section feeding the fuel to the fuel cell; and a secondary cell charged with electric power generated by the fuel cell, the secondary cell being connected with the fuel cell in parallel.

3. The portable device according to claim 2, wherein the fuel feeding section is driven by outputs from the secondary cell and the solar cell.

4. The portable device according to claim 1, wherein a camera and a predetermined functional section are disposed on a portion other than the portion where the air inlets are formed and the solar battery is disposed.

5. The portable device according to claim 1, wherein the solar cell has a three dimensional shape that covers each of the protrusions included on the surface of the case.

* * * * *